(12) United States Patent
Sun et al.

(10) Patent No.: US 11,581,838 B2
(45) Date of Patent: Feb. 14, 2023

(54) SYSTEM AND METHOD FOR WIRELESS POWER TRANSFER IN A LINEAR CART SYSTEM

(71) Applicant: Rockwell Automation Technologies, Inc., Mayfield Heights, OH (US)

(72) Inventors: Xikai Sun, Shanghai (CN); Jadav Das, New York City, NY (US); Tracy M. Clark, Boston, MA (US); Robert H. Schmidt, Mequon, WI (US); Neil R. Bentley, Boston, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 24 days.

(21) Appl. No.: 17/228,944

(22) Filed: Apr. 13, 2021

(65) Prior Publication Data

US 2021/0234488 A1 Jul. 29, 2021

Related U.S. Application Data

(63) Continuation of application No. 16/587,177, filed on Sep. 30, 2019, now Pat. No. 10,985,685.

(51) Int. Cl.
| | |
|---|---|
| *B65G 23/23* | (2006.01) |
| *B65G 54/02* | (2006.01) |
| *B60L 5/00* | (2006.01) |
| *B61B 3/00* | (2006.01) |
| *B61J 1/12* | (2006.01) |
| *H02P 25/064* | (2016.01) |
| *H02K 11/00* | (2016.01) |
| *H02K 41/03* | (2006.01) |

(Continued)

(52) U.S. Cl.
CPC ............ *H02P 25/064* (2016.02); *B65G 23/23* (2013.01); *B65G 35/06* (2013.01); *H02K 11/0094* (2013.01); *H02K 11/04* (2013.01); *H02K 41/031* (2013.01)

(58) Field of Classification Search
CPC ..... B60L 5/005; B60L 15/007; H02K 41/031; H01F 38/14; B65G 54/02; B65G 23/23
USPC ........... 198/750.1, 370.13; 310/12.01, 12.11, 310/12.15
See application file for complete search history.

(56) References Cited

U.S. PATENT DOCUMENTS

| | | |
|---|---|---|
| 5,737,211 A | 4/1998 | Hirai et al. |
| 6,191,507 B1 | 2/2001 | Peltier et al. |
| 6,278,210 B1 | 8/2001 | Fatula, Jr. et al. |

(Continued)

*Primary Examiner* — Douglas A Hess
(74) *Attorney, Agent, or Firm* — Boyle Fredrickson, SC

(57) ABSTRACT

A system for wirelessly transmitting power between a track and independent movers in a motion control system includes a pick-up coil provided proximate to the magnets on the movers. The fundamental component of the voltage applied to the drive coils interacts primarily with the magnetic field generated by the permanent magnets on the movers and not with the pick-up coil. Consequently, the pick-up coil does not interfere with desired operation of the movers but rather, interacts primarily with the harmonic components and has current and voltages induced within the pick-up coil as a result of the harmonic components. The energy captured by the pick-up coil reduces the amplitude of eddy currents on the mover. After harvesting the harmonic content, the pick-up coil may be connected to another circuit on the mover and serve as a supply voltage for the other circuit.

18 Claims, 10 Drawing Sheets

(51) Int. Cl.
*B65G 35/06* (2006.01)
*H02K 11/04* (2016.01)

(56) References Cited

U.S. PATENT DOCUMENTS

| | | |
|---|---|---|
| 6,876,107 B2 | 4/2005 | Jacobs |
| 7,109,610 B2 | 9/2006 | Tamai |
| 7,696,651 B2 | 4/2010 | Miyamoto |
| 7,832,534 B2 | 11/2010 | Hahn et al. |
| 7,907,041 B2 | 3/2011 | Hahn et al. |
| 8,193,886 B2 | 6/2012 | Hahn et al. |
| 8,384,251 B2 | 2/2013 | Shikayama et al. |
| 8,841,785 B2 | 9/2014 | Theuss et al. |
| 9,899,845 B2 * | 2/2018 | Anders ................ H01F 27/361 |
| 9,997,985 B2 | 6/2018 | Prussmeier |
| 10,196,240 B2 | 2/2019 | Piech et al. |
| 10,243,441 B2 | 3/2019 | Jacobs et al. |
| 10,454,356 B2 * | 10/2019 | Borghi ................ H02K 41/033 |
| 10,483,895 B2 | 11/2019 | Sun et al. |
| 10,608,469 B2 * | 3/2020 | Floresta ................ H02J 50/40 |
| 10,985,685 B1 * | 4/2021 | Sun ........................ B65G 35/06 |
| 11,303,242 B2 * | 4/2022 | Sun ........................ H02J 50/10 |

\* cited by examiner

SYSTEM AND METHOD FOR WIRELESS POWER TRANSFER IN A LINEAR CART SYSTEM

CROSS-REFERENCE TO RELATED APPLICATIONS

This application claims priority to U.S. patent application Ser. No. 16/587,177 filed Sep. 30, 2019 and entitled System and Method for Wireless Power Transfer in a Linear Cart System, the entire contents of which is incorporated herein by reference.

BACKGROUND INFORMATION

The subject matter disclosed herein relates generally to harvesting energy transferred between a fixed drive member, such as a series of coils positioned along a track, and a moving drive member, such as an independent cart with permanent magnets mounted thereto, in a linear drive system and, more specifically, to a system which utilizes a pick-up coil positioned around or proximate to the permanent magnets on the moving drive member in the Motion control systems utilizing movers and linear motors can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers" each supported on a track for motion along the track. The track is made up of a number of track segments, and a linear drive system controls operation of the movers, causing the movers to travel along the track. Sensors may be spaced at fixed positions along the track and/or on the movers to provide information about the position and speed of the movers.

Each of the movers may be independently moved and positioned along the track in response to an electromagnetic field generated by the linear drive system. In a typical system, the track forms a path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then returns to the loading station to receive another unit of the product.

In certain applications, it may be desirable to provide an actuator or a sensor on the mover to interact with the product on the mover. For example, a clamp may actuate to secure the product to the mover or a sensor may detect the presence of the product on the mover. However, the actuator or sensor requires an energy source to operate. Because a mover can travel over long distances, it is often not practical to provide a fixed connection, such as an electrical cable or pneumatic line to the mover. Rather, it may be necessary to provide a portable energy source such as a battery for electric actuators or sensors or a pressurized tank for a hydraulic or pneumatic actuator. However, the portable energy source adds weight and takes up space on the mover. Further, the portable energy source needs to be periodically recharged.

One solution for recharging portable energy sources is to provide a dedicated location along the track at which the energy is supplied. The mover stops at the dedicated location where a temporary connection to an energy source may be established. However, the mover must then wait for the portable energy source to be recharged before resuming operation.

Thus, it would be desirable to provide an improved system for supplying power to independent movers on a track in a motion control system.

Although certain applications may allow energy to be provided to a mover via a fixed connection to the mover, a fixed connection is not without certain drawbacks. The fixed connection may be, for example, an electrical conductor or a hydraulic or pneumatic hose. The motion of the mover is typically restricted to limit the required length of the electrical conductor or hose. The number of movers must be limited and/or the motion of the mover is limited to a reciprocal motion to avoid tangling the conductors or hoses between movers.

Thus, it would be desirable to provide a method and apparatus for wirelessly transmitting power between a track and independent movers in a motion control system.

BRIEF DESCRIPTION

The subject matter disclosed herein describes a system for wirelessly transmitting power between a track and independent movers in a motion control system. An Alternating Current (AC) voltage is applied to the drive coils where the AC voltage includes a component at a fundamental frequency as well as a component, or components, at harmonic frequencies. A pick-up coil is provided around or proximate to the magnets on the movers in the linear drive system. Because a linear drive system is a synchronous machine, the fundamental component of the AC voltage applied to the drive coils along the track interacts primarily with the magnetic field generated by the permanent magnets on the movers and not with the pick-up coil applied around the magnets. As a result, the pick-up coil does not interfere with the desired operation of the movers. Rather, the pick-up coil interacts primarily with the harmonic components and has current and voltages induced within the pick-up coil as a result of the harmonic components present in the voltage applied to the coils. Thus, wireless power transfer occurs between the drive coils and the pick-up coil without interfering with desired operation of the movers.

After harvesting the harmonic content, the pick-up coil may also be connected to another circuit on the mover and serve as a supply voltage for the other circuit. The mover may include, for example, a sensor, a signal indictor, an actuator, or the like mounted on the mover. The energy harvested by the pick-up coil allows for wireless delivery of power to the mover and, subsequently, to the other electrical device mounted on the mover.

According to one embodiment of the invention, an apparatus for wireless power transfer in an independent cart system includes a track having a length and multiple drive coils mounted along the length of the track. At least one power segment is operative to supply an alternating current (AC) voltage to each of the drive coils, and the AC voltage includes at least a fundamental component and a harmonic component. Multiple movers are operative to travel along the track. Each of the movers includes a drive member and a pick-up coil mounted proximate the drive member. The fundamental component of the AC voltage is operative to generate an electromagnetic field which engages the drive member to propel each mover along the track, and the harmonic component of the AC voltage is operative to generate an electromagnetic field which engages the pick-up coil to induce a voltage in the pick-up coil.

According to another embodiment of the invention, a method for wireless power transfer in an independent cart system is disclosed. Multiple movers are operative to travel along a track in the independent cart system, and an alternating current (AC) voltage is generated with at least one power segment, where the AC voltage includes at least a fundamental component and a harmonic component. The AC voltage is sequentially supplied to multiple drive coils mounted along the track. The fundamental component of the AC voltage generates an electromagnetic field that sequentially moves along the plurality of drive coils and interacts with a drive member on each of the plurality of movers to drive the corresponding mover along the track. A voltage is induced in a pick-up coil mounted proximate to the drive member as the corresponding mover is driven along the track, where the harmonic component of the AC voltage generates an electromagnetic field that induces the voltage in the pick-up coil.

According to still another embodiment of the invention, a mover is configured to wirelessly receive power in an independent cart system. The mover includes a drive member emitting a magnetic field and at least one pick-up coil mounted proximate the drive member. The magnetic field is configured to engage a fundamental component of a moving electromagnetic field to drive the mover along a track in the independent cart system, and the pick-up coil is configured to receive power from at least one harmonic component of the moving electromagnetic field.

According to yet another embodiment of the invention, an apparatus for wireless power transfer in an independent cart system includes a track having a length, a plurality of drive coils mounted along the length of the track, and at least one power segment operative to supply an alternating current (AC) voltage to each of the plurality of drive coils. The AC voltage includes at least a fundamental component and a harmonic component, the fundamental component of the AC voltage is operative to generate an electromagnetic field configured to engage a drive member mounted on a mover for the independent cart system to propel the mover along the track, and the harmonic component of the AC voltage is operative to generate an electromagnetic field configured to engage a pick-up coil mounted on the mover to induce a voltage in the corresponding pick-up coil.

According to still another embodiment of the invention, an apparatus for wireless power transfer in an independent cart system includes at least one power segment and multiple movers, where the at least one power segment is operative to supply an alternating current (AC) voltage to multiple drive coils for the independent cart system. Each mover includes a drive member and a pick-up coil. The drive member is configured to engage a fundamental component of an electromagnetic field generated by each of the drive coils, and the pick-up coil is configured to engage at least one harmonic component of the electromagnetic field.

According to an additional embodiment of the invention a method for wireless power transfer in an independent cart system is disclosed, where multiple movers are operative to travel along a track in the independent cart system. An alternating current (AC) voltage is generated with at least one power segment, where the AC voltage includes at least a fundamental component and a harmonic component. The AC voltage is supplied to drive coils mounted along the track. The fundamental component of the AC voltage generates an electromagnetic field configured to interact with a drive member on each of the movers to drive the corresponding mover along the track, and the harmonic component of the AC voltage induces a voltage in a pick-up coil mounted on the corresponding mover.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
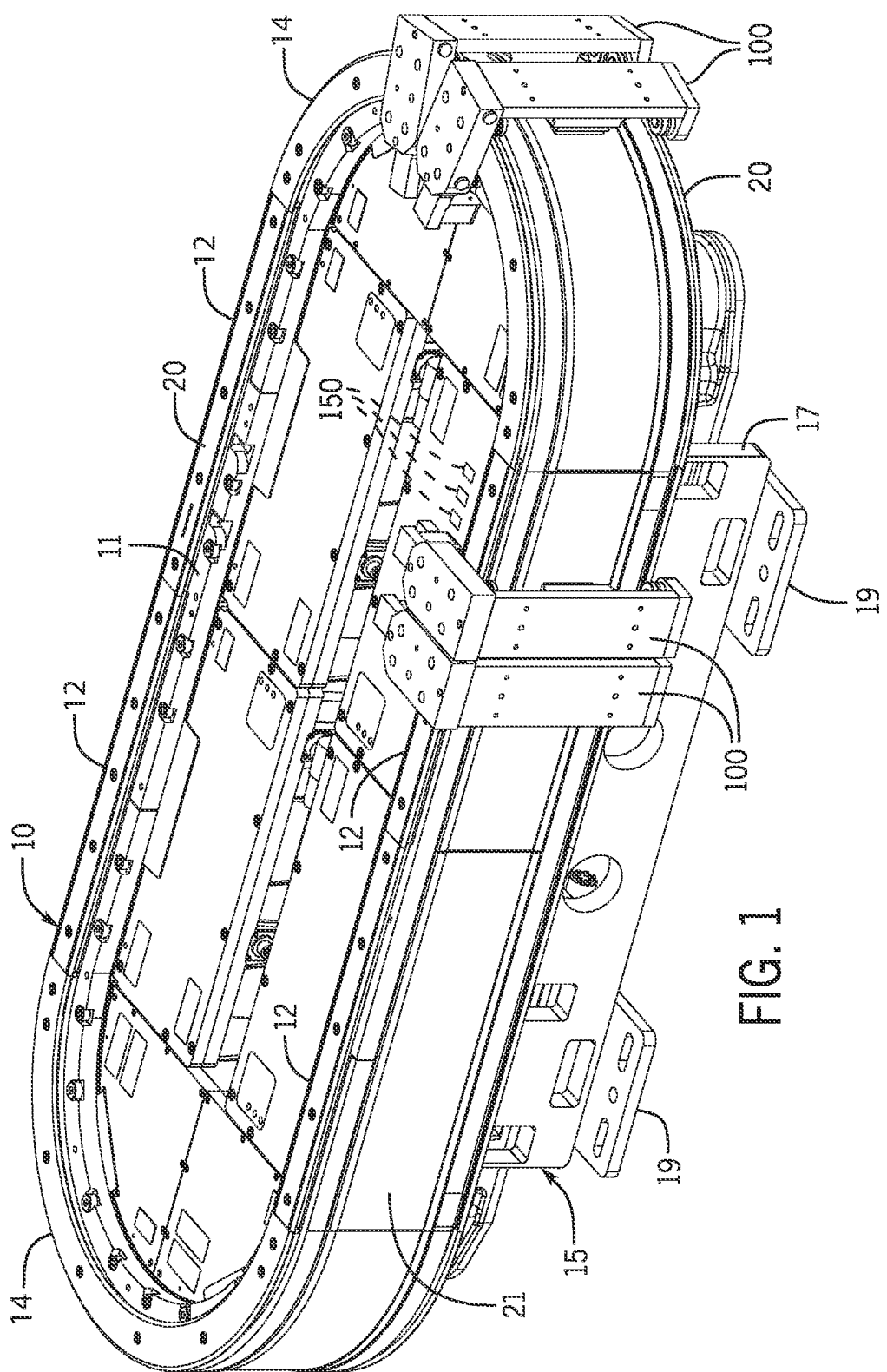
FIG. 1 is an isometric view of an exemplary linear cart system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary transport system for moving articles or products includes a track 10 made up of multiple segments 12, 14. According to the illustrated embodiment, the segments define a generally closed loop supporting a set of movers 100 movable along the track 10. The track 10 is oriented in a horizontal plane and supported above the ground by a base 15 extending vertically downward from the track 10. According to the illustrated embodiment, the base 15 includes a pair of generally planar support plates 17, located on opposite sides of the track 10, with mounting feet 19 on each support plate 17 to secure the track 10 to a surface. The illustrated track 10 includes four straight segments 12 with two straight segments 12 located along each side of the track and spaced apart from the other pair. The track 10 also includes four curved segments 14 where a pair of curved segments 14 is located at each end of the track 10 to connect the pairs of straight segments 12. The four straight segments 12 and the four curved segments 14 form a generally oval track and define a closed surface over which each of the movers 100 may travel. It is understood that track segments of various sizes, lengths, and shapes may be connected together to form a track 10 without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12, 14 is shown in a generally horizontal orientation. The track segments 12, 14 may also be oriented in a generally vertical orientation and the width of the track 10 may be greater in either the horizontal or vertical direction according to application requirements. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiment, rails 20 extend generally along the outer periphery of the track 10. A first rail 20 extends along an upper surface 11 of each segment and a second rail 20 extends along a lower surface 13 of each segment. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the width of the track 10 and span only a partial width of the surface of the track 10 on which it is attached. According to the illustrated embodiment, each rail 20 includes a base portion 22 mounted to the track segment and a track portion 24 along which the mover 100 runs. Each mover 100 includes complementary rollers 110 to engage the track portion 24 of the rail 20 for movement along the track 10.

Figure 3:
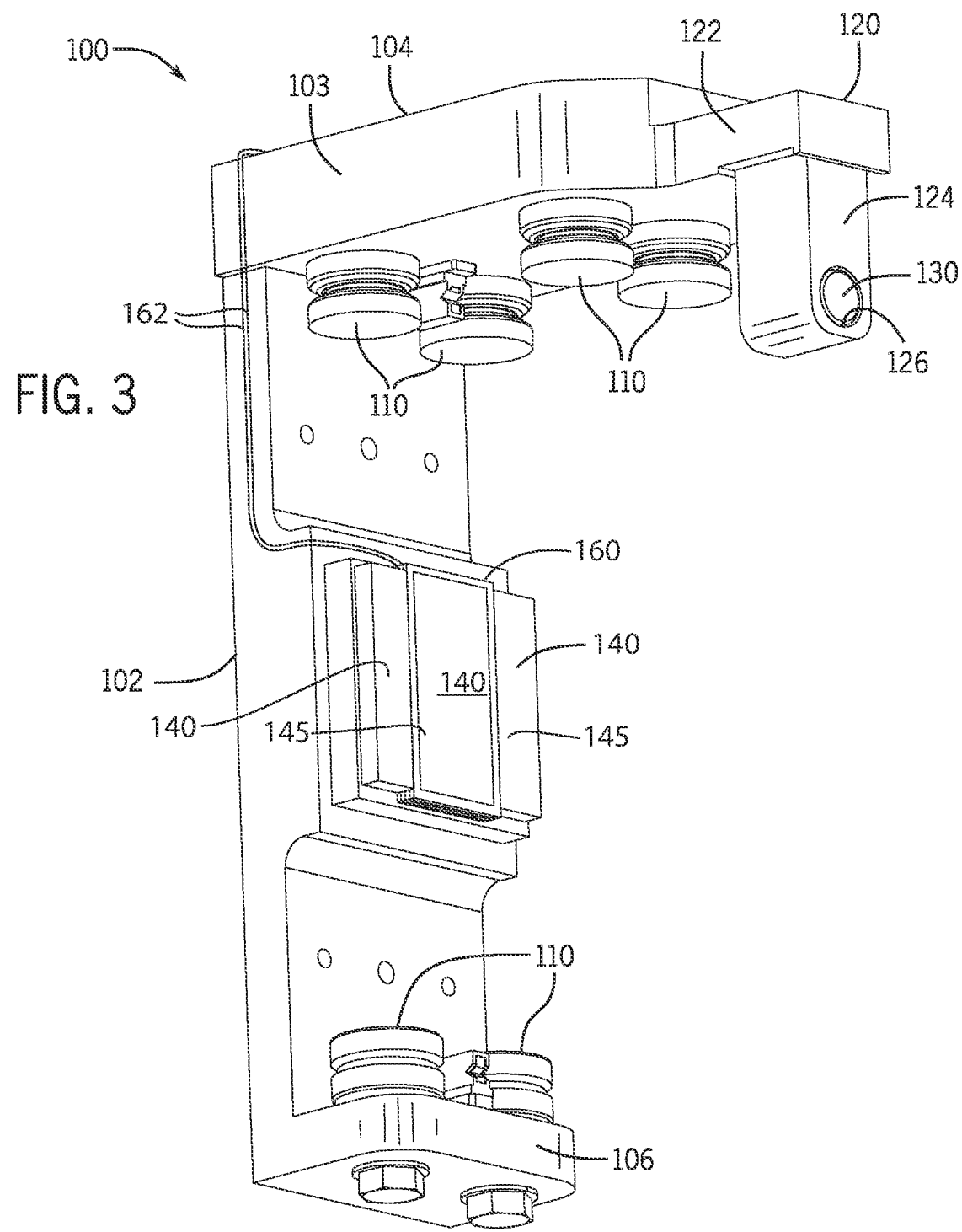
FIG. 3 is an isometric view of a mover from the transport system of FIG. 2.

One or more movers 100 are mounted to and movable along the rails 20 on the track 10. With reference next to FIG. 3, an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted within the top surface 11 of the track segment.

A linear drive system is incorporated in part on each mover 100 and in part within each track segment 12, 14 to control motion of each mover 100 along the segment. The coils 50 mounted along the length of the track 10 serve as first drive members. Each mover 100 includes a second drive member which is configured to interact with electromagnetic fields generated by the coils 50 to propel the mover 100 along the track 10. It is contemplated that the drive members on each mover may be drive magnets, steel back iron and teeth, conductors, or any other suitable member that will interact with the electromagnetic fields generated by the coils 50. Commonly, the drive member on each mover includes permanent magnets which emit a magnetic field. The magnetic field generated by the drive member on each mover improves the mover interaction with the electromagnetic field generated by the coils in comparison to a magnetically salient structure that has no magnetic field. For convenience, the invention will be discussed with respect to drive magnets 140 being used as the drive member within each mover 100. However, it is understood that the other magnetically salient structures may be employed without deviating from the scope of the invention.

In the linear drive system, a series of coils 50 are positioned along the length of the track 10. Each mover 100 includes at least one drive magnet 140 configured to interact with an electromagnetic field generated in the coils. Successive activation of the coils 50 establishes a moving electromagnetic field that interacts with the magnetic field generated by each permanent magnet 140 mounted on the movers 100 and that causes the mover 100 to travel along the track 10. Controlled voltages are applied to each coil 50 to achieve desired operation of the movers.

As will be discussed in more detail below, a power segment 210 generates the controlled voltage to be applied to the coils. The power segment 210 may utilize a modulation technique, such as pulse-width modulation (PWM), to control operation of the power semiconductor devices that selectively connect a DC voltage to an output of the power segment and, in turn, to each coil 50. The PWM operates at a frequency substantially greater than a desired fundamental frequency applied to the coils 50. For example, the PWM routine may operate in the kilohertz or tens of kilohertz while a desired fundamental frequency is commonly in the tens or hundreds of hertz. By varying the duration and polarity of DC voltage applied to the output within the switching frequency, the desired fundamental frequency of an AC voltage for each coil 50 is approximated at the output of the power segment. The modulated voltage waveform includes both the desired fundamental component to control operation of the movers 50 as well as harmonic components which may be used to induce a voltage in a pick-up coil 160 mounted on the mover 100.

Figure 2:
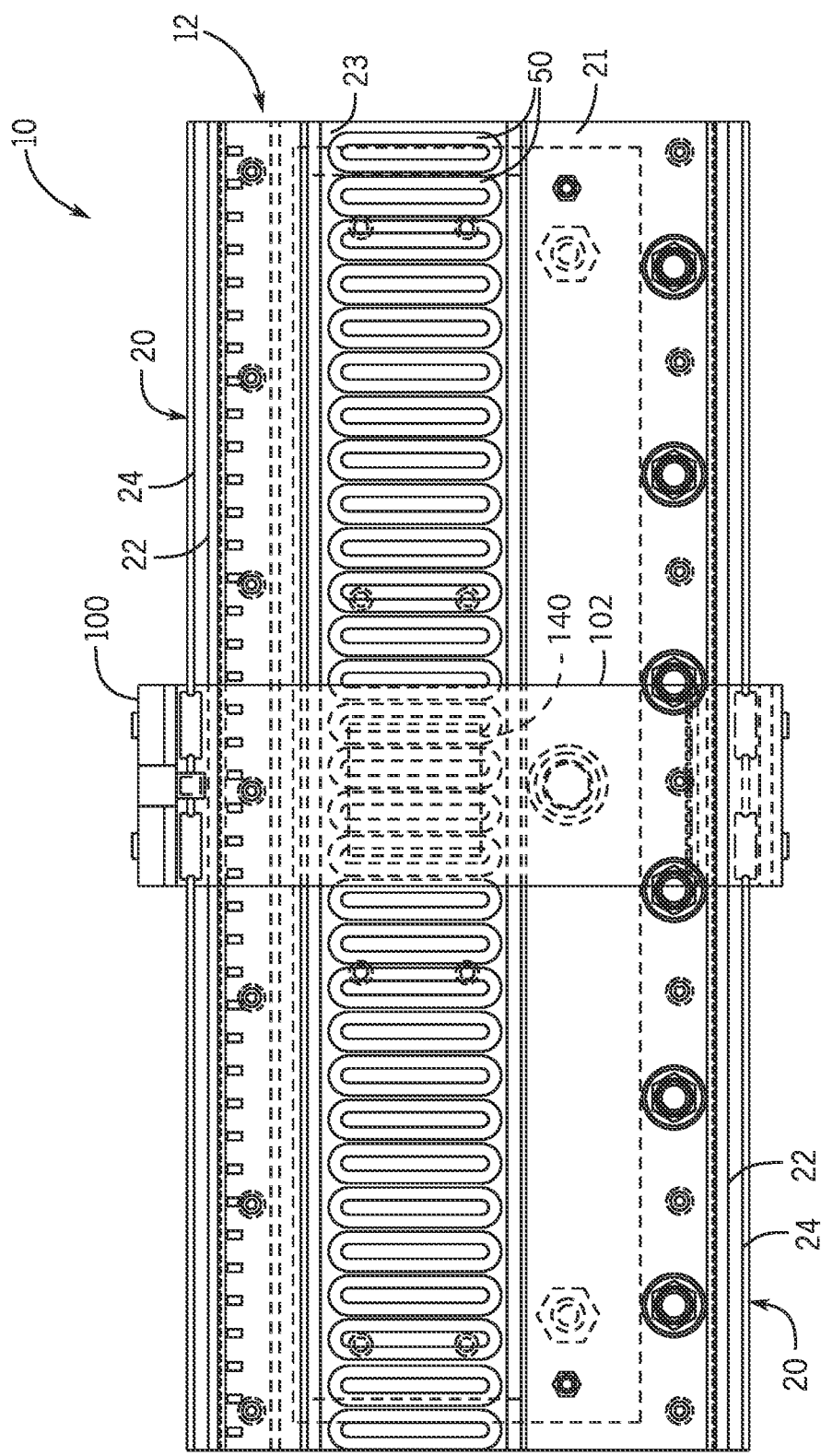
FIG. 2 is a partial side elevation view of one segment of one embodiment of the linear cart system of FIG. 1 illustrating activation coils distributed along one surface of the track segment.

According to one embodiment of the invention shown in FIG. 2, the linear drive system includes drive magnets 140 mounted to the side member 102. According to the illustrated embodiment, the drive magnets 140 are arranged in a block along an inner surface of the side member facing the track segment 12. The drive magnets 140 are typically permanent magnets, and two adjacent magnet segments including a north pole and a south pole may be considered a pole-pair.

Figure 14:
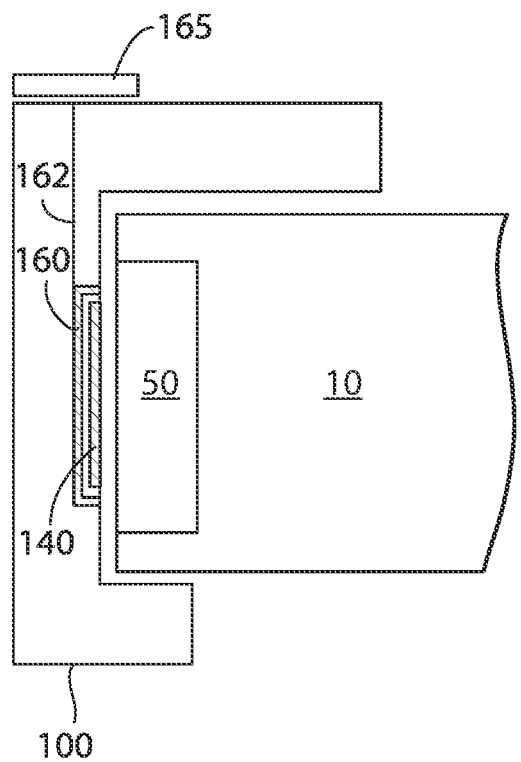
FIG. 14 is a partial sectional view of the transport system of FIG. 1.

Each mover 100 further includes at least one pick-up coil 160 mounted to the mover. According to the embodiment illustrated in FIG. 3, a channel 145 exists between each half drive magnet 140 positioned to the outer edges of the magnet block and the full drive magnet 140 centrally positioned on the magnet block. The pick-up coil 160 is wound around the full drive magnet 140 within the channel 145. A pair of conductors 162 extend from the pick-up coil 160 to an upper surface of the top member 104. With reference also to FIG. 14, it is contemplated that an electric circuit may be mounted on the mover, for example, via a printed circuit board (PCB) 165 located on the top member 104. The electric circuit may be configured to receive a voltage induced in the pick-up coil 160 as the mover travels along the track 10.

Figure 5:
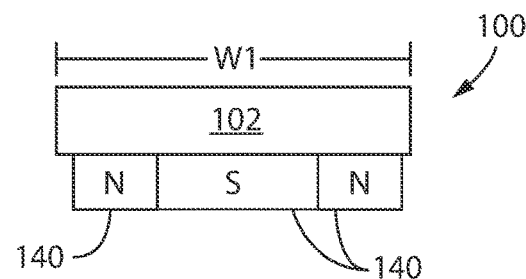
FIG. 5 is a partial sectional view of a mover illustrating an exemplary magnet configuration for a mover having a first width.
Figure 6:
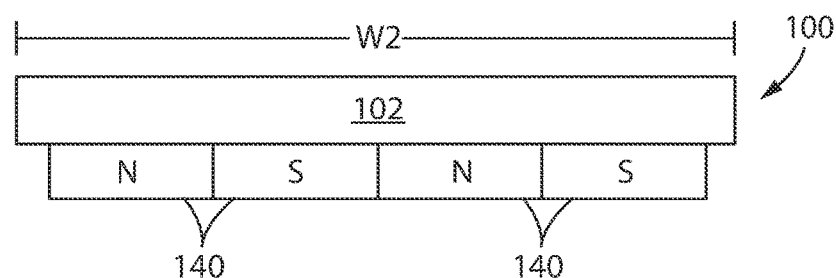
FIG. 6 is a partial sectional view of a mover illustrating an exemplary magnet configuration for a mover having a second width.
Figure 7:
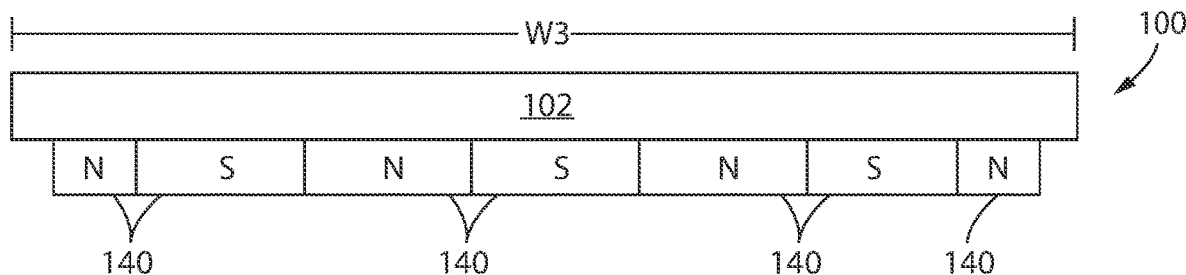
FIG. 7 is a partial sectional view of a mover illustrating an exemplary magnet configuration for a mover having a third width.

It is contemplated that a track 10 may be configured to have movers 100 of different sizes and/or movers 100 having different magnet configurations traveling along the same track. With reference next to FIGS. 5-7, three movers 100, each having a different width and a different magnet configuration are illustrated. Turning first to FIG. 5, a mover 100 having a first width, W1, is illustrated. The mover 100 includes a first half of a drive magnet 140 mounted proximate one side of the mover 100 and a second half of a drive magnet mounted proximate the other side of the mover 100. Between the two halves, a whole drive magnet 140 is mounted. Each of the two halves are arranged such that one polarity of the drive magnet 140 faces the drive coils and the whole drive magnet 140 is arranged such that the other polarity of the drive magnet 140 faces the drive coils. As illustrated, each of the half drive magnets 140 has a north pole, N, facing the drive coils and the whole drive magnet 140 has a south pole, S, facing the drive coils. Turning then to FIG. 6, a mover 100 having a second width, W2, is illustrated. The mover 100 includes four whole drive magnets positioned adjacent to each other. Adjacent drive magnets 140 alternately having a north pole, N, and south pole, S, pole face the drive coils. Turning next to FIG. 7, a mover 100 having a third width, W3, is illustrated. The mover 100 includes a first half of a drive magnet 140 mounted proximate one side of the mover 100 and a second half of a drive magnet mounted proximate the other side of the mover 100. Between the two halves, a series of whole drive magnets 140 are mounted. Each of the two halves are arranged such that one polarity of the drive magnet 140 faces the drive coils and the whole drive magnets 140 are arranged such that the polarity of the drive magnets 140 alternate between the two half magnets. As illustrated, each of the half drive magnets 140 has a north pole, N, facing the drive coils and the whole drive magnets 140 have alternating south and north poles facing the drive coils. The illustrated magnet configurations are exemplary only and not intended to be limiting. It is contemplated that magnets having, for example, different widths or different arrangements of north and south poles may be utilized without deviating from the scope of the invention.

Figure 10:
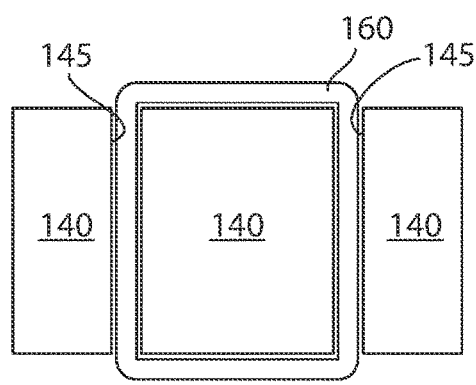
FIG. 10 is a side elevation view of one embodiment of a pick-up coil positioned around one arrangement of drive magnets as may be incorporated onto a mover.
Figure 11:
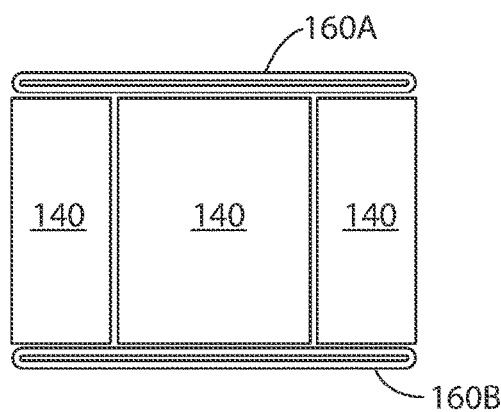
FIG. 11 is a side elevation view of one embodiment of multiple pick-up coils positioned around another arrangement of drive magnets as may be incorporated onto a mover.
Figure 12:
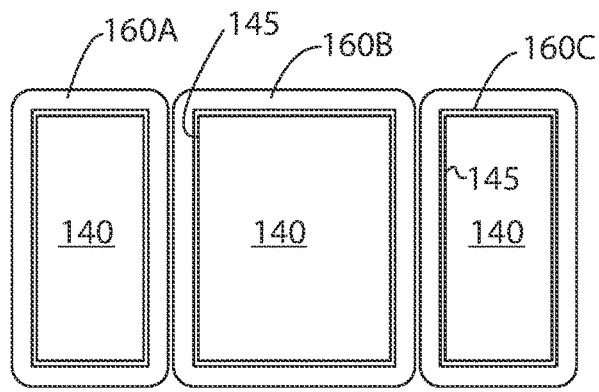
FIG. 12 is a side elevation view of one embodiment of multiple pick-up coils positioned around the arrangement of drive magnets shown in FIG. 10 as may be incorporated onto a mover.
Figure 13:
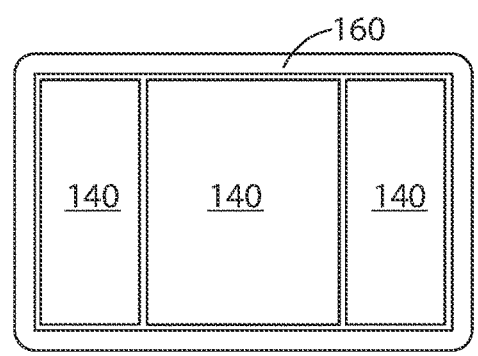
FIG. 13 is a side elevation view of one embodiment of a pick-up coil positioned around the arrangement of drive magnets shown in FIG. 11 as may be incorporated onto a mover.

In addition to varying configurations of drive magnets 140, it is contemplated that each mover 100 may have different configurations of a pick-up coil 160. With reference next to FIGS. 10-13, four different configurations of a pick-up coil, or coils, 160 are illustrated for the magnet configuration of FIG. 5. In FIG. 10, a channel 145 is provided between adjacent drive magnets 140. It is contemplated that a single pick-up coil 160 may be wound around the central drive magnet 140. According to one aspect of the invention, the pick-up coil 160 may be wound from a solid conductor or from Litz wire. According to another aspect of the invention, the pick-up coil 160 may be formed from a number of traces on one or more layers of a printed circuit board (PCB) shaped to be inserted within the channel 145. In FIG. 12, it is contemplated that multiple coils 160 may be provided, where a first coil 160A is wound around one half drive magnet, a second coil 160B is wound around the full drive magnet, and a third coil 160C is wound around the second half drive magnet. The first coil 160A and the second coil 160B share the channel 145 between the first half drive magnet and the full drive magnet, and the second coil 160B and the third coil 160C share the channel 145 between the full drive magnet and the second half drive magnet. Optionally and as shown in FIGS. 11 and 13, the drive magnets 140 may be arranged tightly adjacent to each other without room for a pick-up coil to be mounted between adjacent drive magnets 140. One or more pick-up coils 160 may be mounted adjacent to the drive magnets. In FIG. 11, a first pick-up coil 160A is wound adjacent to the top side of the drive magnets 140 and a second pick-up coil 160B is wound adjacent to the bottom side of the drive magnets 140. In FIG. 13, a single pick-up coil 160 is wound around the periphery of the set of drive magnets 140. It is contemplated that various configurations of magnets 140, channels 145 and pick-up coils 160 may be used without deviating from the scope of the invention, where the configurations may use, but are not limited to, the arrangements of magnets 140 shown in FIGS. 5-7 and/or the arrangements of pick-up coils 160 shown in FIGS. 10-13 to arrive at numerous different embodiments of the present invention.

Figure 4:
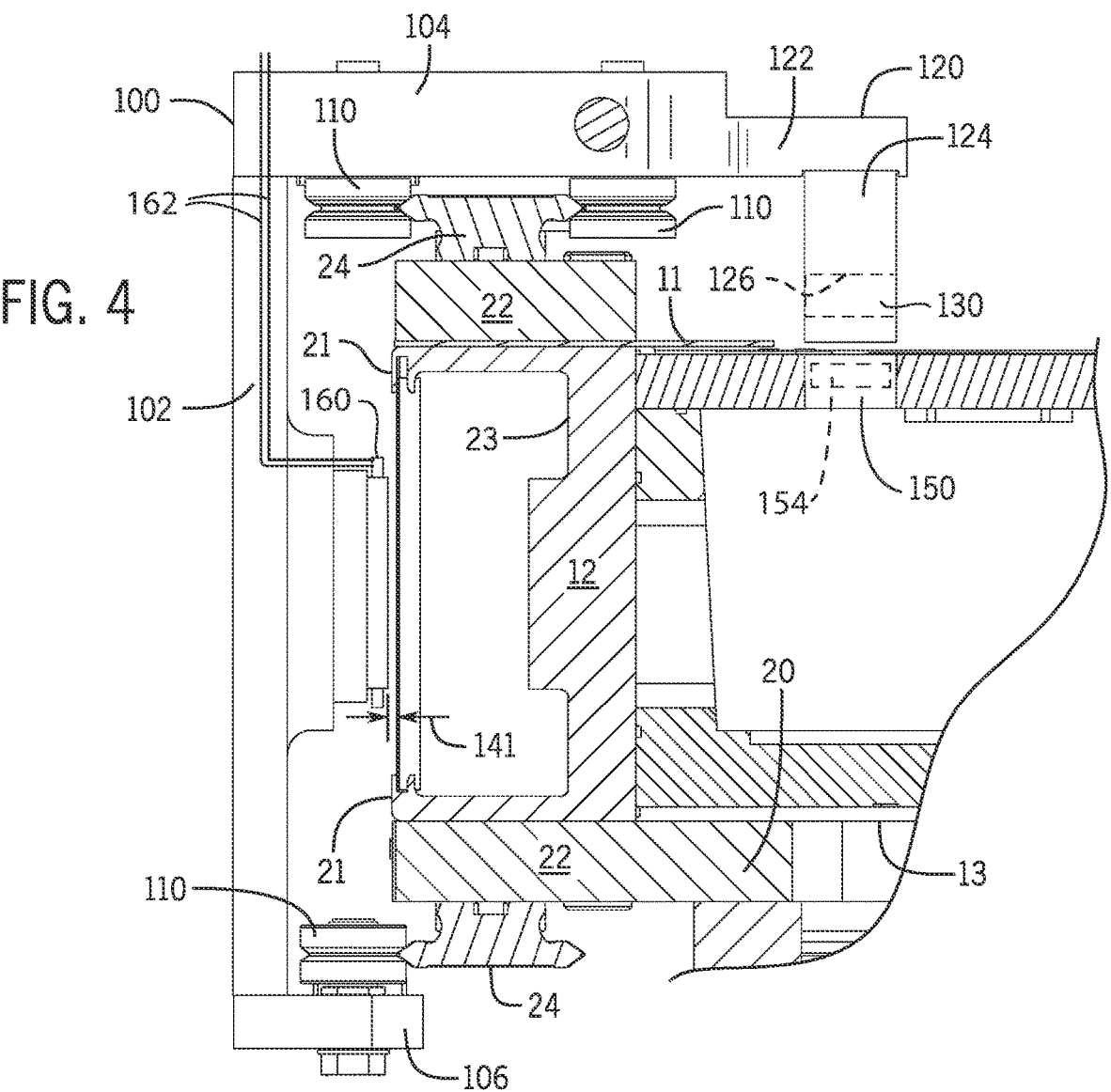
FIG. 4 is a partial sectional view of the transport system of FIG. 1.

With reference again to FIG. 3, the drive magnets 140 are mounted on the inner surface of the side member 102 and when mounted to the track 10 are spaced apart from a series of coils 50 extending along the track 10. As shown in FIG. 4, an air gap 141 is provided between each set of drive magnets 140 and the coils 50 along the track 10. On the track 10, the linear drive system includes a series of parallel coils 50 spaced along each track segment 12 as shown in FIG. 2. According to the illustrated embodiment, each coil 50 is placed in a channel 23 extending longitudinally along one surface of the track segment 12. The electromagnetic field generated by each coil 50 spans the air gap 141 and interacts with the drive magnets 140 mounted to the mover 100 to control operation of the mover 100.

Figure 8:
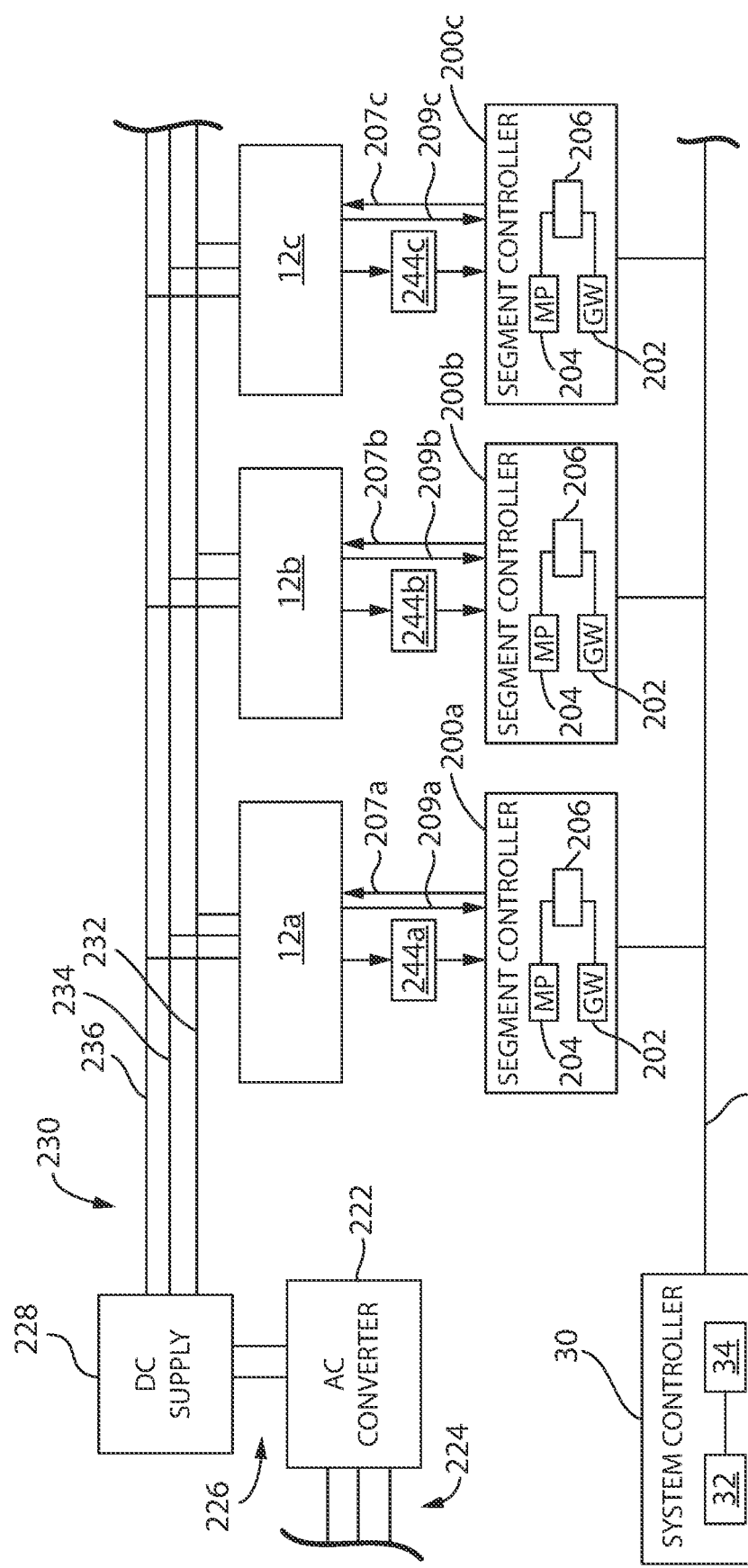
FIG. 8 is a block diagram representation of an exemplary power and control system for the transport system FIG. 1.

Turning next to FIG. 8, an exemplary power and control system for the track 10 and linear drive system is illustrated. A segment controller 200 is mounted within each track segment 12. The segment controller 200 receives command signals from a system controller 30 and generates switching signals for power segments 210 (FIG. 9) which, in turn, control activation of each coil 50. Activation of the coils 50 are controlled to drive and position each of the movers 100 along the track segment 12 according to the command signals received from the system controller 30.

The illustrated motion control system includes a system controller 30 having a processor 32 and a memory device 34. It is contemplated that the processor 32 and memory device 34 may each be a single electronic device or formed from multiple devices. The processor 32 may be a microprocessor. Optionally, the processor 32 and/or the memory device 34 may be integrated on a field programmable array (FPGA) or an application specific integrated circuit (ASIC). The memory device 34 may include volatile memory, non-volatile memory, or a combination thereof. The system controller 30 could be a Programmable Logic Controller (PLC). A user interface 36 is provided for an operator to configure the system controller 30 and to load or configure desired motion profiles for the movers 100 on the system controller 30. It is contemplated that the system controller 30 and user interface 36 may be a single device, such as a laptop, notebook, tablet or other mobile computing device. Optionally, the user interface 36 may include one or more separate devices such as a keyboard, mouse, display, touchscreen, interface port, removable storage medium or medium reader and the like for receiving information from and displaying information to a user. Optionally, the system controller 30 and user interface 36 may be integrated into an industrial computer mounted within a control cabinet and configured to withstand harsh operating environments. It is contemplated that still other combinations of computing devices and peripherals as would be understood in the art may be utilized or incorporated into the system controller 30 and user interface 36 without deviating from the scope of the invention.

One or more programs may be stored in the memory device 34 for execution by the processor 32. The system controller 30 receives one or more motion profiles for the movers 100 to follow along the track 10. A program executing on the processor 32 is in communication with a segment controller 200 on each track segment 12 via a control network 201, such as an EtherNet/IP network. The system controller 30 may transfer a desired motion profile to each segment controller 200 or, optionally, the system controller 30 may perform some initial processing based on the motion profile to transmit a segment of the motion profile to each segment controller 200 according to the portion of the motion profile to be executed along that segment. Optionally, the system controller 30 may perform still further processing on the motion profile and generate a desired switching sequence for each segment 12 that may be transmitted to the segment controller 200.

A gateway 202 in each segment controller 200 receives the communications from the system controller 30 and passes the communication to a processor 204 executing in the segment controller 200. The processor may be a microprocessor. Optionally, the processor 204 and/or a memory device within the segment controller 200 may be integrated on a field programmable array (FPGA) or an application specific integrated circuit (ASIC). It is contemplated that the processor 204 and memory device 206 may each be a single electronic device or formed from multiple devices. The memory device 206 may include volatile memory, non-volatile memory, or a combination thereof. The segment controller 200 receives the motion profile, or portion thereof, or the switching sequence transmitted from the system controller 30 and utilizes the motion profile or switching sequence to control movers 100 present along the track segment 12 controlled by that system controller 30.

Figure 9:
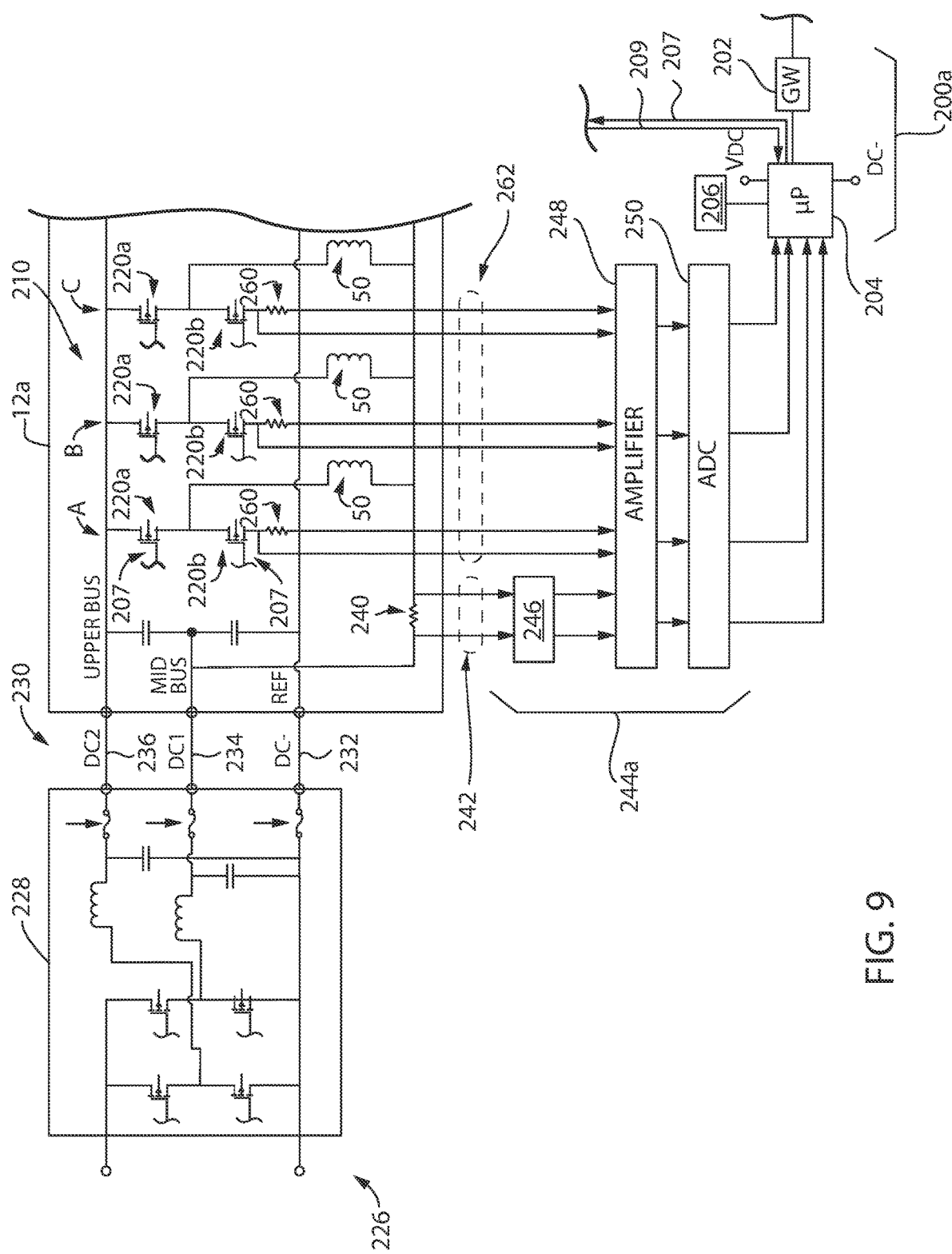
FIG. 9 is an exemplary schematic for a portion of the power and control system of FIG. 8.

With additional reference to FIG. 9, each segment controller 200 generates switching signals 207 to control operation of switching devices within one or more power segments 210 mounted within the track segment 12. The switching devices within each power segment 210 are connected between a power source and the coils 50. The switching signals 207 are generated to sequentially energize coils 50 along a track segment, where the energized coils 50 create an electromagnetic field that interacts with a magnetic field generated by the drive magnets 140 on each mover 100 to control motion of the movers 100 along the corresponding track segment 12. The switching signals 207 control operation of switching devices 220 in communication with the drive coils 50, including upper switch devices 220a and lower switching devices 220b. The switching devices 220 may be solid-state devices that are activated by the switching signals 207, including, but not limited to, transistors, such as insulated-gate bipolar transistors, thyristors, or silicon-controlled rectifiers.

According to the illustrated embodiment, an AC converter 222 (FIG. 8) can receive a single or multi-phase AC voltage 224 from a power grid. The AC converter 222, in turn, can provide a DC voltage 226 using, for example, a rectifier front end, at input terminals of a DC supply 228, which could be a DC-to-DC buck converter. The DC supply 228, in turn, can provide a distributed DC bus 230 at the input terminals of the segments 12, including: a DC reference voltage rail 232, configured to provide a DC reference voltage ("DC-") such as ground (0 V); a mid-bus DC voltage rail 234, configured to provide half DC power at a mid-bus voltage ("DC 1") such as 200 V; and a full-bus DC voltage rail 236, configured to provide DC power at a full-bus voltage ("DC 2"), such as 400 V. Although illustrated external to the track segment 12, it is contemplated that the DC bus 230 would extend within the segments 12. Each segment 12 includes connectors to which either the DC supply or another track segment may be connected such that the DC bus 230 may extend for the length of the track 10. Optionally, each track segment 12 may be configured to include a rectifier section (not shown) and receive an AC voltage input. The rectifier section in each track segment 12 may convert the AC voltage to the DC bus 230 utilized by the corresponding track segment. It is contemplated that the polarities and magnitudes of the various rails of the DC bus 230 may vary within the scope of the invention.

The processor 204 also receives a feedback signal 209 from the position sensors 150 along the track segment 12 to provide an indication of the presence of one or more movers 100. In each power segment 210, the processor 204 can generate the switching signals 207 to control the various switching devices 220 to provide power to respective coils 50 for propelling a mover 100 while continuously receiving feedback signals for determining positions of the mover 100. For example, in a first leg "A," the processor 204 can drive the upper and lower switching devices 220a and 220b, respectively, to control a corresponding coil 50 in the first leg A to propel the mover 100. The processor 204 can detect movement of the mover 100 from the first leg A toward an area corresponding to the second leg "B" via the feedback signals from the position sensors 150. The processor 204 can then drive the upper and lower switching devices 220a and 220b, respectively, to control a corresponding coil 50 in the second leg B to continue propelling the mover 100, according to a predetermined motion profile. In each leg, the lower switching devices 220b can be coupled to the DC-voltage rail 232, the upper switching device 220a can be coupled to the full-bus DC voltage rail 236, and the coil 50 can be coupled between the upper and lower switching devices 220a and 220b, respectively, on a first side and the mid-bus DC-voltage rail 234 on a second side. Accordingly, the switching devices 220 in each leg can be configured to connect a coil 50 in the leg between rails of the DC bus 230 in various states, such as the upper switching devices 220a connecting or disconnecting full-bus DC voltage rail 236 to a coil 50 causing positive current flow in coil 50, and/or the lower switching device 220b connecting or disconnecting DC-voltage rail 232 to a coil 50 causing negative current flow in coil 50.

The processor 204 receives feedback signals from voltage and/or current sensors mounted at an input or output of the power segment 210 providing an indication of the current operating conditions of the DC bus 230 within the power segment 210 or the current operating conditions of a coil 50 connected to the power segment 210, respectively. According to the illustrated embodiment, sensing resistors 260 are shown between lower switching devices 220b and the DC-reference voltage rail 232 to detect current through the lower switching devices. Signals from either side of the sensing resistors are provided to the signal conditioning circuitry 244. Similarly, a bus sensing resistor 240 is shown in series with the mid-bus DC-voltage rail 234. Signals from either side of the bus sensing resistor 240 are provided to the signal condition circuitry 244 through an isolation circuit 246. The signals are provided via an amplifier 248 and an Analog-to-Digital Converter (ADC) 250 to the processor 204 to provide a measurement of the current flowing through each of the sensing resistors 260 and the bus sensing resistor 240. It is contemplated that still other sensing resistors or other current transducers and voltage transducers may be located at various locations within the power segment 210 to provide current and/or voltage feedback signals to the processor 204 corresponding to current and/or voltage levels present on any leg of the DC bus 230 or at the output to any of the coils 50 connected to the power segment 210.

In operation, each segment controller 200 receives a reference signal, such as a motion profile, a voltage reference, or a series of switching signals corresponding to desired operation of the mover 100 present on the corresponding track segment 12, 14. The segment controller 200 regulates the voltage output to the coils 50 to sequentially energize coils 50 along the track segment, where the energized coils 50 create an electromagnetic field that interacts with the drive magnets 140 on the mover to drive the mover 100 along the track 10. The segment controller 200 may utilize a modulation technique, such as pulse width modulation (PWM) to generate a voltage waveform for each coil 50 having a varying amplitude and varying frequency to achieve desired operation of the mover.

Figure 16:
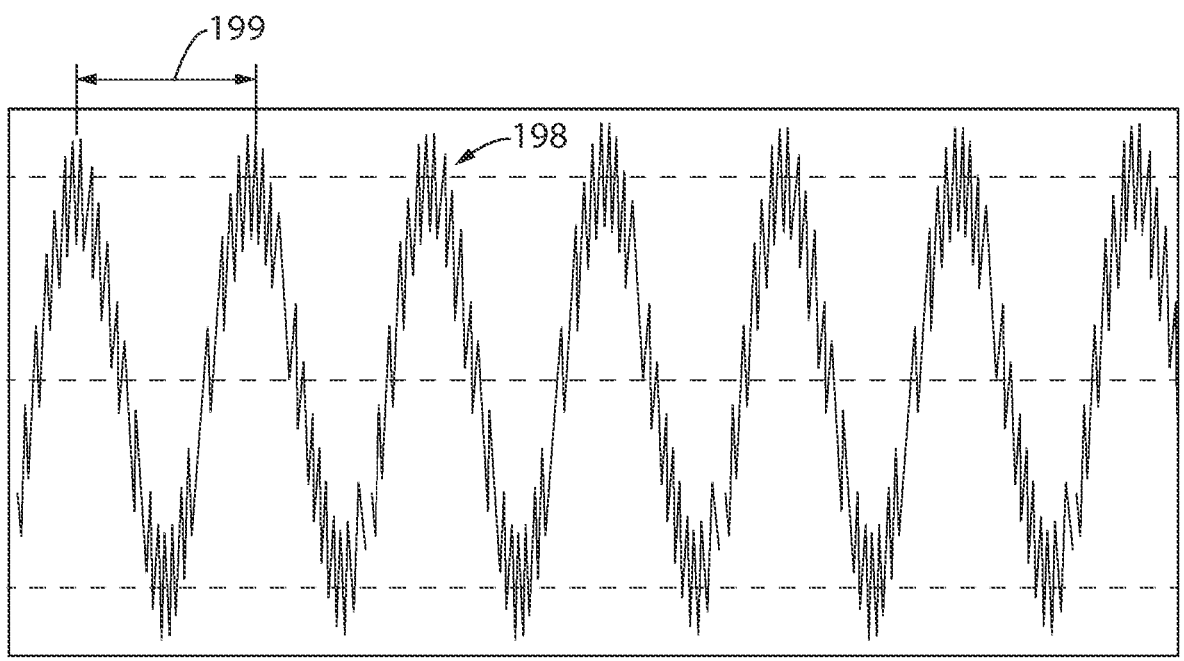
FIG. 16 is a graphical representation of a current supplied to the coils of the linear drive system.

With reference next to FIG. 16 an exemplary waveform 198 of current supplied to the coils 50 as a result of the modulated voltage waveform from the segment controller 200 is illustrated. The current includes a fundamental component and harmonic content resulting from the modulation. The period 199 of one cycle of the fundamental frequency is indicated, and it may be observed that the magnitude of the fundamental component of the current dominates the waveform 198. Harmonic components present in the current waveform 198 generate the ripple current present on top of the fundamental component. This current is an exemplary current that may be produced in the coils 50 along a track 10 when a PWM voltage waveform is applied.

As previously discussed, coils 50 are sequentially energized to engage a mover 100. Voltages are sequentially supplied to coils such that the current waveform 198 of FIG. 16 appears to "travel" along the length of the track 10. Only a portion of one cycle of the current waveform 198 may be required at any one coil 50 to interact with the drive magnets 140 if, for example, a single north and south pole are present on the mover 100. Alternately, several cycles of the current waveform 198 may be required if the drive magnets 140 include multiple north and south poles establishing multiple pole pairs on the mover 100. The drive magnets 140 are drawn along the track 10 as the magnetic field emitted by the magnets are attracted the electromagnetic field generated by the current in each coil. The fundamental component of the current waveform 198 generates the driving force and performs the work necessary to propel the mover. The frequency of the fundamental component of current applied to the coils 50 determines the speed at which the mover 100 travels along the track. The current in one coil 50 establishes a varying electromagnetic field that interacts with the constant magnetic field emitted from the drive magnets at the location of the coil, while the "traveling" current along sequentially activated coils 50 establishes a moving electromagnetic field to interact with the constant magnetic field of the drive magnets 140 to drive the mover 100 along the track 10.

While the fundamental component of the current waveform 198 generates the driving force to propel a mover 100, each component of the current (i.e., fundamental and harmonic) create electromagnetic fields that interact with the mover 100. The electromagnetic fields generated as a result of the harmonic components may cause a ripple torque observed by the mover 100 or establish eddy currents in the drive magnets 140, which, in turn, are dissipated as heat losses in the mover 100.

The pick-up coil 160 mounted to the mover 100 reduces the ripple current and eddy currents generated by the harmonic components in the current waveform 198 of each coil 50. When a coil is present in a moving electromagnetic field, a voltage is induced in the coil. Because the mover 100 travels at a speed corresponding to the frequency of the fundamental component of the current waveform 198, the pick-up coil 160 mounted to the mover 100 experiences no moving electromagnetic field as a result of the fundamental component. In other words, the mover 100 and the pick-up coil 160 mounted to the mover is traveling at the same rate as the current "travels" along sequentially enabled coils 50. As a result, the pick-up coil 160 experiences a constant electromagnetic component from the fundamental component of the current which does not induce a voltage in the pick-up coil 160. The pick-up coil 160, therefore, does not impact performance of the fundamental component of current as it interacts with the drive magnets 140 on the mover 10.

The harmonic content in the current waveform 198 is present at frequencies other than the fundamental component. These harmonic components, therefore, generate electromagnetic fields that "travel" along the track at different speeds than the mover 100. The pick-up coil 160, therefore, experiences moving magnetic fields as a result of the harmonic components present in the current waveform 198, where the frequency of the moving electromagnetic field, as experienced by the pick-up coil 160 is the difference between the frequency of the harmonic component and the fundamental component. These moving electromagnetic fields experienced by the pick-up coil 160 induce a voltage in the pick-up coil. Further, the energy used to generate the voltage in the pick-up coil 160 is no longer available to generate a ripple torque or undesirable eddy currents within the drive magnets 140 of the mover.

Figure 15:
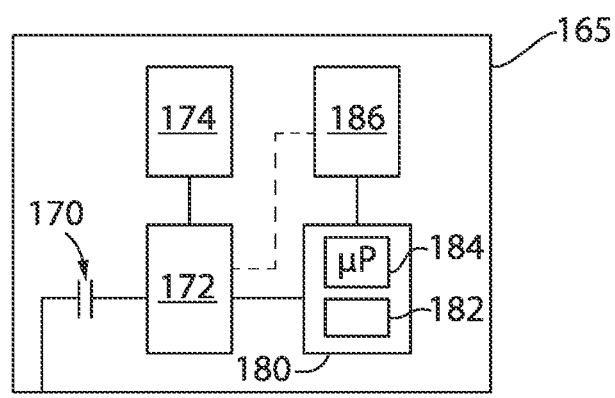
FIG. 15 is a block diagram representation of an electronic circuit mounted on a mover.

According to another aspect of the invention, the pick-up coil 160 provides wireless power transfer from the track 10 to the corresponding mover 100 on which the pick-up coil 160 is mounted. The pick-up coil 160 may be connected to a circuit mounted on the mover 100 and serve as a wireless power source for the circuit. With reference next to FIGS. 14 and 15, an exemplary circuit includes a circuit board 165 mounted to the upper surface of the mover 100. The circuit board 165 may include various configurations of electronic components according to an application's requirements. The circuit may include a power converter 172 configured to receive the AC voltage induced on the pick-up coil 160 as an input and to provide a second voltage as an output. The power converter may include, for example, diodes arranged as a passive rectifier to convert the AC voltage to a DC voltage. The power converter may also include a capacitance connected to the output of the passive rectifier in order to reduce a ripple present on the DC voltage from rectification. Optionally, the power converter 172 may include or be made up entirely by a voltage regulator. The voltage regulator may be configured to receive the rectified DC voltage or the AC voltage induced in the pick-up coil 160 as an input and supply one or more constant DC voltages for use by other devices on the circuit board 165.

The circuit board 165 may further include an energy storage device 174, such as a storage capacitor or battery to store energy received at the pick-up coil 160. During periods of time when the energy received via the pick-up coil 160 exceeds the energy required by the electronic devices on the circuit board 165, the power converter 172 may supply energy to the energy storage device 174. During periods of time when the energy received via the pick-up coil 160 is less than the energy required by the electronic devices on the circuit board 165, the power converter 172 may draw from the stored energy.

It is contemplated that the energy received by the pick-up coil may be used to energize at least one electronic device 186 mounted on the mover 100. The electronic device 186 may be on the circuit board 165, external from the circuit board, or a combination thereof. The electronic device 186 will be selected according to the application requirements but may include, for example, an indicator providing a status of operation on the mover, an actuator interacting with a product on the mover, a sensor providing a status, such as the presence or absence, of a product on the mover, and the like. Sensors may be provided that, for example, detect vibration or temperature on the mover 100. The energy harvested by the pick-up coil 160 may provide for advanced analytics, condition monitoring, or safety applications to be incorporated in the linear drive system as a result of the wireless power transfer between the coils 50 and the pick-up coil 160.

It is further contemplated that a control circuit 180 may be required to control operation of the electronic device 186. The control circuit 180 may be a series of discrete logic devices implementing combinatorial logic, a processor 184 operative to execute instructions stored in memory 182, or a combination thereof. Additionally, multiple electronic devices 186 may be mounted on the mover 100. The control circuit 180 may receive one or more inputs corresponding to an operating status of the mover, a product on the mover, or of the controlled process with which the mover is interacting and may generate one or more outputs to an actuator to achieve a desired performance in response to the inputs.

The electronic device(s) 186 may further include a wireless transmitter or transceiver operative to transmit information from the control circuit 180 to a receiver or second transceiver mounted on the track, adjacent to the track, in the system controller 30, or to any other suitable location according to the application requirements. The transmitter may communicate via a radio frequency (RF) signal, infrared signal, or via any other wireless communication medium and as would be understood in the art.

It is further contemplated that a capacitive element 170 may be operatively connected to the pick-up coil 160. The capacitive element 170 may be a single capacitor or multiple capacitors connected in series, parallel, or a combination thereof. The inductive nature of the pick-up coil 160 in combination with the capacitive element 170 forms an L-C circuit. The inductance and capacitance values may be selected to establish a resonance in the L-C circuit at a frequency that is coincident with the frequency of one of the harmonic components. The resonance will increase the efficiency and capacity of power transfer between the electromagnetic field established by the corresponding harmonic component and the pick-up coil 160. Optionally, an additional inductor may also be connected with the pick-up coil 160 and the capacitive element 170 to obtain a desired resonance from the L-C circuit. Increasing the capacity of power transfer from the electromagnetic field established by the corresponding harmonic component to the pick-up coil 160 both reduces undesirable effects on the system as a result of the harmonic components and increases the power available on the mover 100 to energize the various electronic devices mounted on the mover.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An apparatus for wireless power transfer in an independent cart system, the apparatus comprising:
    a track having a length;
    a plurality of drive coils mounted along the length of the track; and
    at least one power segment operative to supply an alternating current (AC) voltage to each of the plurality of drive coils, wherein:
        the at least one power segment uses a modulation technique to generate the AC voltage,
        the AC voltage includes at least a fundamental component and a plurality of harmonic components,
        the fundamental component of the AC voltage is operative to generate an electromagnetic field configured to engage a drive member mounted on a mover for the independent cart system to propel the mover along the track, and
        each of the plurality of harmonic components of the AC voltage is operative to generate an electromagnetic field configured to engage a pick-up coil mounted on the mover to induce a voltage in the corresponding pick-up coil.

2. An apparatus for wireless power transfer in an independent cart system, the apparatus comprising:
    at least one power segment operative to supply an alternating current (AC) voltage to each of a plurality of drive coils for the independent cart system; and
    a plurality of movers, wherein each mover includes:
        a drive member configured to engage a fundamental component of an electromagnetic field generated by each of the plurality of drive coils,
        a pick-up coil configured to engage at least one harmonic component of the electromagnetic field, and
        at least one additional circuit mounted on the mover, wherein the at least one additional circuit receives an induced voltage from the pick-up coil as an input and is configured to provide a regulated voltage as an output.

3. The apparatus of claim 2 wherein each mover further includes at least one energy storage device mounted on the mover and wherein the at least one energy storage device receives the regulated voltage from the at least one additional circuit.

4. The apparatus of claim 2 wherein each mover further includes at least one electronic device mounted to the mover, wherein the at least one electronic device receives the regulated voltage from the at least one additional circuit.

5. The apparatus of claim 4 wherein the at least one electronic device is selected from one of an indicator, an actuator, a sensor, a wireless transmitter, a wireless receiver, and a wireless transceiver.

6. The apparatus of claim 2 wherein the drive member includes at least one drive magnet spaced apart from the plurality of drive coils by an air gap as the corresponding mover travels along the track.

7. The apparatus of claim 2 wherein each of the plurality of movers includes a plurality of pick-up coils and each of the plurality of pick-up coils is mounted proximate the drive member.

8. The apparatus of claim 2 wherein each of the plurality of movers further comprises a capacitive load operatively connected to the at least one pick-up coil.

9. The apparatus of claim 2 wherein:
    the independent cart system includes a track having a length,
    the plurality of drive coils are mounted along the length of the track, and
    the plurality of movers are operative to travel along the track.

10. A method for wireless power transfer in an independent cart system, wherein a plurality of movers are operative to travel along a track in the independent cart system, the method comprising the steps of:
    generating an alternating current (AC) voltage with at least one power segment, wherein the AC voltage includes at least a fundamental component and a harmonic component;
    supplying the AC voltage to a plurality of drive coils mounted along the track, wherein the fundamental component of the AC voltage generates an electromagnetic field configured to interact with a drive member on each of the plurality of movers to drive the corresponding mover along the track; and
    inducing a voltage in a pick-up coil mounted on the corresponding mover via the harmonic component of the AC voltage.

11. The method of claim 10 wherein the drive member includes at least one drive magnet spaced apart from the plurality of drive coils by an air gap as the corresponding mover travels along the track.

12. The method of claim 10 wherein each of the plurality of movers includes a plurality of pick-up coils and each of the plurality of pick-up coils is mounted proximate the drive member.

13. The method of claim 10 further comprising the step of providing a capacitive load operatively connected to the pick-up coil.

14. The method of claim 10 further comprising the step of storing at least a portion of the power from the pick-up coil in an energy storage device on each of the plurality of movers.

15. The method of claim 10 further comprising the steps of:
    receiving the voltage induced in the pick-up coil at an input of a voltage regulator on the corresponding mover; and
    generating at least one DC voltage at an output of the voltage regulator.

16. The method of claim 15 further comprising the step of energizing at least one electronic device from the at least one DC voltage.

17. The method of claim 16 wherein the at least one electronic device is selected from one of an indicator, an actuator, a sensor, a wireless transmitter, a wireless receiver, and a wireless transceiver.

18. The method of claim 10, wherein the step of supplying the AC voltage to the plurality of drive coils further includes sequentially supplying the AC voltage to the plurality of drive coils mounted along the track, wherein the fundamental component of the AC voltage generates an electromagnetic field that sequentially moves along the plurality of drive coils and wherein the harmonic component of the AC voltage generates an electromagnetic field that induces the voltage in the pick-up coil as the corresponding mover is driven along the track.

* * * * *